(12) United States Patent
Rawding et al.

(10) Patent No.: US 11,667,239 B2
(45) Date of Patent: Jun. 6, 2023

(54) EXTERIOR REAR VIEW ASSEMBLY AND SEAL

(71) Applicant: MOTHERSON INNOVATIONS COMPANY LIMITED, London (GB)

(72) Inventors: Steve Rawding, Portchester (GB); Oscar Malicki, Portchester (GB)

(73) Assignee: MOTHERSON INNOVATIONS COMPANY LIMITED, London (GB)

( * ) Notice: Subject to any disclaimer, the term of this patent is extended or adjusted under 35 U.S.C. 154(b) by 0 days.

(21) Appl. No.: 17/679,510

(22) Filed: Feb. 24, 2022

(65) Prior Publication Data
US 2022/0314885 A1 Oct. 6, 2022

(30) Foreign Application Priority Data

Mar. 31, 2021 (DE) .......................... 102021203267.2

(51) Int. Cl.
*B60R 1/12* (2006.01)
*B60R 1/06* (2006.01)
*B60R 16/02* (2006.01)

(52) U.S. Cl.
CPC .................. *B60R 1/12* (2013.01); *B60R 1/06* (2013.01); *B60R 16/0222* (2013.01); *B60R 2001/1253* (2013.01)

(58) Field of Classification Search
CPC ......... B60R 1/12; B60R 1/06; B60R 16/0222; B60R 2001/1253
(Continued)

(56) References Cited

U.S. PATENT DOCUMENTS 4,234,218 A * 11/1980 Rogers ................ B29C 61/0608
174/DIG. 8
4,646,995 A * 3/1987 Matsui ................ H02G 3/0641
174/153 G
(Continued)

FOREIGN PATENT DOCUMENTS

EP 2407349 B1 4/2014
GB 2448049 A 10/2008
(Continued)

OTHER PUBLICATIONS

English translation of Office Action for German Patent Application No. 10 2021 203 267.2, dated Sep. 10, 2021, 6 pages.
(Continued)

*Primary Examiner* — Terrell L McKinnon
*Assistant Examiner* — Michael McDuffie
(74) *Attorney, Agent, or Firm* — Westman, Champlin & Koehler, P.A.

(57) ABSTRACT

The present invention provides an exterior rear view assembly, comprising: a base frame comprising a bodywork side surface configured to be attached to a vehicle body; a seal configured to be attached to the base frame for sealing at least one feed-through opening, which is provided on the bodywork side surface, wherein the seal comprises an attachment section attachable to the bodywork side surface of the base frame and comprising at least one locking element for locking the seal in the feed-through opening, wherein the seal further comprises a grommet section configured for feed-through of a cable harness and protruding from the attachment section in a vehicle outboard direction. Furthermore, the invention provides a seal for such an exterior rear view assembly.

18 Claims, 3 Drawing Sheets

(58) Field of Classification Search
USPC .... 248/686, 580, 596, 56, 57, 71, 73, 475.1;
359/872, 871, 844
See application file for complete search history.

(56) References Cited

U.S. PATENT DOCUMENTS

| | | | | |
|---|---|---|---|---|
| 5,553,818 | A * | 9/1996 | Wild | F16C 1/262 |
| | | | | 248/74.2 |
| 5,856,635 | A * | 1/1999 | Fujisawa | B60R 16/0222 |
| | | | | 174/153 G |
| 6,315,421 | B1 * | 11/2001 | Apfelbeck | B60R 1/04 |
| | | | | 359/872 |
| 6,971,755 | B1 * | 12/2005 | Mobley | B60R 1/087 |
| | | | | 359/872 |
| 6,995,317 | B1 | 2/2006 | Dzurilla | |
| 7,005,579 | B2 * | 2/2006 | Beele | F16L 5/10 |
| | | | | 174/152 G |
| 7,049,515 | B1 * | 5/2006 | Collins | H02G 3/083 |
| | | | | 174/58 |
| 8,720,845 | B2 * | 5/2014 | Courbon | B60R 1/0617 |
| | | | | 359/872 |
| 8,746,904 | B2 | 6/2014 | Herrmann et al. | |
| 9,590,348 | B2 * | 3/2017 | Grudzewski | H01R 13/5202 |
| 11,108,218 | B2 * | 8/2021 | Yokoyama | H02G 3/0462 |
| 11,396,987 | B2 * | 7/2022 | Iseki | F21S 41/29 |
| 2011/0080667 | A1 * | 4/2011 | Heger | B60R 1/06 |
| | | | | 359/871 |
| 2011/0317296 | A1 * | 12/2011 | Schmierer | B60R 1/07 |
| | | | | 359/871 |
| 2012/0014007 | A1 | 1/2012 | Herrmann et al. | |
| 2012/0033313 | A1 | 2/2012 | Herrmann et al. | |
| 2014/0353926 | A1 * | 12/2014 | Fukuda | B60R 16/0222 |
| | | | | 428/192 |
| 2015/0321608 | A1 * | 11/2015 | Nishimura | B60R 1/06 |
| | | | | 359/871 |
| 2016/0090738 | A1 * | 3/2016 | de Freitas Silvestre | E04B 5/36 |
| | | | | 52/745.05 |

FOREIGN PATENT DOCUMENTS

| | | |
|---|---|---|
| JP | 2002308015 A | 10/2002 |
| JP | 2013067197 A | 4/2013 |
| JP | 2013133045 A | 7/2013 |

OTHER PUBLICATIONS

Office Action for German Patent Application No. 10 2021 203 267.2, dated Sep. 10, 2021, 4 pages.
Search Report under Section 17, for counterpart Great Britain Patent Application No. GB2204033.1, dated Apr. 8, 2022, 4 pages.

* cited by examiner

EXTERIOR REAR VIEW ASSEMBLY AND SEAL

FIELD OF THE INVENTION

The present invention relates to an exterior rear view assembly. Furthermore, the present invention relates to a seal for such an exterior rear view assembly.

BACKGROUND OF THE INVENTION

In exterior rear view systems, especially in assemblies configured to connect a vehicle body to a structure and actuators and/or sensors and/or mirrors of a rear view system, a seal is provided for feeding through a cable harness configured for energy and/or data transfer between a vehicle infrastructure and the actuators and/or sensors and/or mirrors.

Document U.S. Pat. No. 8,746,904 discloses a seal of an exterior rear view mirror assembly. The seal comprises a sealing pad attached to the mirror base structure and a sealing grommet extending from the mirror base towards inboard of the vehicle body and is attached inside the vehicle body to an internal structure of the vehicle body. In a central part of the seal, which is connected to the sealing grommet and arranged inside the vehicle body in a mounted state, the seal comprises an internal diameter section being smaller than the sealing grommet in length and in diameter. A cable harness enters the grommet inside the vehicle body and the diameter difference between the grommet and the internal diameter section allows a predetermined bending radius for the cable harness.

SUMMARY OF THE INVENTION

In view of the above, there is the need to provide a new and improved exterior rear view assembly, which in particular allows an improved package.

In accordance with the present invention, an exterior rear view assembly as recited in claim 1 and a seal as recited in claim 12 are provided. Advantageous or preferred features of the invention are recited in the dependent claims.

According to one aspect, therefore, the present invention provides an exterior rear view assembly, comprising: a base frame comprising a bodywork side surface configured to be attached to a vehicle body; a seal configured to be attached to the base frame for sealing at least one feed-through opening, which is provided on the bodywork side surface, wherein the seal comprises an attachment section attachable to the bodywork side surface of the base frame and comprising at least one locking element for locking the seal in the feed-through opening, wherein the seal further comprises a grommet section configured for feed-through of a cable harness and protruding from the attachment section in a vehicle outboard direction.

In this way, the invention provides an assembly which is configured for tight packaging of internal components in the vehicle body, which results in less room for a bending radius of the cable harness in the vicinity of the feed through. Therefore, the present invention proposes positioning the grommet section of the cable harness seal outboard relative to the vehicle in order to alleviate pressure caused by the sharp turn of the cable harness. In this way, the present invention prevents pressure from the harness causing the attachment section of the seal to become dislodged from its seating within the base frame. Furthermore, the locking element holds the seal in the seating. Additionally, by positioning the grommet section outboard, the grommet section can be used as a form factor in the manner of a poke yoke or form coding to ensure proper orientation of the seal.

The outboard direction is oriented opposite to the bodywork side surface and preferably forms the main direction, in particular the only direction, of extension of the grommet section from the attachment section. In particular, the grommet section is extending into or contained within the base frame, which is inboard the rear view assembly. Accordingly, "vehicle outboard direction" is to be understood as a direction outboard with respect to the vehicle body.

According to a further aspect, the at least one locking element comprises a plurality of noses which are configured to contact the base frame in a form and/or frictional locking manner. Accordingly, the seal can be inserted into the feed-through opening with the grommet section side, the noses are then displaced as the attachment section is inserted. Once the attachment section is completely inserted, the noses spring back to hold the seal in place against the surface of the base frame.

According to a further aspect, the at least one locking element comprises a plurality of recesses which are configured to contact the base frame in a form and/or frictional locking manner. Accordingly, the base frame may comprise counter-locking elements, such as ribs, noses or the like that engage with the recesses.

According to a further aspect, the attachment section is formed with a flange configured to fit in the feed-through opening in a sealing manner. The at least one locking element is configured to secure the seat of the flange in the feed-through opening. In particular, the structure of the base frame is then secured between the flange and the locking element.

According to a further aspect, the grommet section is formed as a tube. In particular, the tube has a constant inner diameter. The inner diameter may form a sealing surface configured to seal against the cable harness, and an outer diameter which may be brought in contact to fastening means, such as a cable tie.

According to a further aspect, the grommet section comprises at its free end an integral diameter extending element locally extending an outer diameter of the grommet section. The diameter extending element may serve as a form fit for a fastening means. In particular, the diameter extending element may be formed as a lip or flange.

According to a further aspect, the diameter extending element is formed discontinuously around the perimeter of the grommet section. For example, a lip may not extend around the complete perimeter but only partly around the grommet section, for example around one half thereof. In this way, an undercut of the form of the grommet section is locally avoided and the diameter extending element can be easily formed integral with the grommet section.

According to a further aspect, the diameter extending element is arranged at a distance from the attachment section, wherein an intervening segment of the grommet section has a constant outer diameter and is configured to accommodate a cable tie. In this way, the cable harness and the grommet section can be easily fixed with each other in manufacturing by means of a cable tie.

According to a further aspect, the attachment section and the grommet section are formed integrally in one part. In this way, the number of parts of the assembly is advantageously reduced and no joining of the attachment section and grommet section is necessary.

According to a further aspect, the attachment section comprises a tear-off section configured to be manually torn-off, such that an additional aperture is created in the seal. In particular, the tear-off section may comprise a pull-tab configured to be torn off manually. Accordingly, an additional aperture can be created or not, depending on individual requirements or different configurations of the assembly. For example, the additional aperture may serve for an additional cable harness used for optional sensors or a rear view system, such as an optional camera or the like.

According to a further aspect, the seal is inserted at least partially in the at least one feed-through opening of the base frame and comprises a bodywork side sealing surface facing towards the bodywork side surface. In particular, the bodywork side sealing surface forms part of the attachment section. In this way, the bodywork side surface of the base frame is sealed by inserting the seal into the feed-through opening.

According to a further aspect, the grommet section comprises an inner diameter sealing surface configured to seal against the cable harness. Accordingly, a reliable seal is provided against the cable harness in a mounted state.

According to a further aspect, the exterior rear view assembly is configured to carry a rear view mirror and the base frame is formed as a mirror base. Accordingly, the cable harness may be configured as a power supply and control line, e. g. for a mirror actuator, a mirror glass heating or the like. Other examples for functions and devices incorporated into and/or controlled with the help of rearview devices that may be supplied and/or controlled by means of the cable harness comprise also illumination devices, for example any kind of light module like an external light module, an internal light module, a front light, a back light, a fog light, a brake light, an acceleration light, a turn signal, a logo lamp, a front area illumination light, a ground illumination light, a puddle light, a flash light, a navigation light, a position light, an emergency light, a spotlight, a green light, a red light, a warning light, a turn signal light module, an approach light, a search light, an information light, a display and/or any combination thereof. Further examples for functions and devices incorporated into and/or controlled with the help of rearview devices that may be supplied and/or controlled by means of the cable harness can comprise for example a tiredness detection system, a microsleep detection system, a distance and/or velocity determination system, for example a LIDAR (Light detection and ranging) system, a blind spot indicator system, a lane change assistant system, a navigation assistant system, a tracking assistant system, a human-machine interaction system, a machine-machine interaction system, an emergency and precaution assistant system, like an accident avoiding assistant system, a counter-measures assistant system, a brake assistant system, a steering assistant system, an acceleration assistant system, an escape assistant system, comprising for example an ejection seat system, a direction indicator, a blind spot indicator, an approach system, a strong braking system, an emergency braking system, a charging status indicator, a vehicle mode system, comprising for example a sports mode system, an economy mode system, an autonomous drive mode system, a sleep mode system and an anti-theft system, a vehicle locked indicator system, a vehicle stolen indicator, a warning signal system, a temperature indicator system, a weather indicator system, a traffic light signal system, a fuel status system and/or any combination thereof.

According to a further aspect, the exterior rear view assembly is configured to carry a rear view camera and the base frame is formed as a camera mounting arm. Accordingly, the cable harness may be configured for example as a power supply to the camera and a video signal line from the camera to a vehicle infrastructure.

According to an aspect, the present invention also provides a seal for an exterior rear view assembly, in particular for an exterior rear view assembly according to the invention. The seal comprises an attachment section configured to be attached to a bodywork side surface of a mirror base frame and comprising a bodywork side sealing surface configured for facing towards the bodywork side surface and for sealing at least one feed-through opening which is provided on the bodywork side surface. The attachment section further comprises at least one locking element for locking the seal in the feed-through opening. Furthermore, the seal comprises a grommet section configured for feeding through a cable harness and comprising an inner diameter sealing surface configured to seal against the cable harness, wherein the grommet section protrudes from the attachment section in an outboard direction.

As already stated above, the invention intents to allow tighter packaging of internal components in the vehicle body, which results in less room for a bending radius of the cable harness in the vicinity of the feed through. Therefore, the present invention proposes to orient the grommet section of the seal outboard in order to alleviate pressure caused by the sharp turn of the cable harness. In this way, the present invention prevents pressure from the harness causing the attachment section of the seal to become dislodged from its seating within the base frame.

Additionally, by positioning the grommet section outboard, the grommet section can be used as a form factor in the manner of a poke yoke or form coding to ensure proper orientation of the seal.

The attachment section is configured to be mounted to the bodywork side surface such that the extension direction of the grommet section is oriented outboard in a mounted state. Accordingly, the outboard direction is in particular oriented opposite to the bodywork side surface.

The above aspects can be combined with each other as desired, if useful. Further possible embodiments, further configurations and implementations of the invention also include combinations, not explicitly mentioned, of features of the invention described herein with respect to the embodiments. In particular, the skilled person will thereby also add individual aspects as improvements or additions to the respective basic form of the present invention.

BRIEF DESCRIPTION OF THE DRAWINGS

For a more complete understanding of the invention and the advantages thereof, exemplary embodiments of the invention are explained in more detail in the following description with reference to the accompanying drawing figures, in which like reference characters designate like parts and in which.

The accompanying drawings are included to provide a further understanding of the present invention and are incorporated in and constitute a part of this specification. The drawings illustrate particular embodiments of the invention and together with the description serve to explain the principles of the invention. Other embodiments of the invention and many of the attendant advantages of the invention will be readily appreciated as they become better understood with reference to the following detailed description.

It will be appreciated that common and/or well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not actually required. It will also be understood that the terms and expressions used in the present specification have the ordinary meaning as is accorded to such terms and expressions with respect to their corresponding respective areas of inquiry and study, except where specific meanings have otherwise been set forth herein.

DETAILED DESCRIPTION OF EMBODIMENTS

Figure 1:
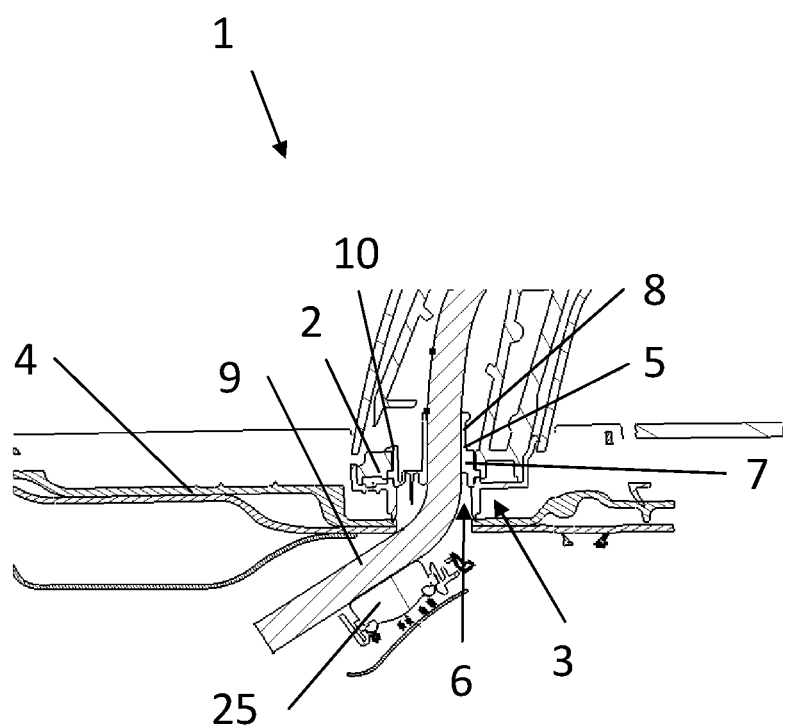
FIG. 1 is a schematic sectional view of a rear view assembly attached to a vehicle body.

With reference firstly to FIG. 1 of the drawings, a schematic sectional view of a rear view assembly attached to a vehicle body is illustrated schematically.

The exterior rear view assembly 1 comprises a base frame 2 forming the structural basis of the rear view assembly. The base frame 2 comprises a bodywork side surface 3, which has a feed-through opening 6 and is attached to a vehicle body 4.

In the present illustrative embodiment, the vehicle body comprises multiple walls which are merged in the area of the feed-through opening 6 such that the bodywork side surface 3 fits in the vehicle body 4 and an opening in the vehicle body coincides with the feed-through opening 6 of the base frame 2.

The exterior rear view assembly 1 further comprises a seal 5 configured to be attached to the base frame 2 for sealing the feed-through opening 6. The seal 5 comprises an attachment section 7 attachable to the bodywork side surface 3 of the base frame 2 and comprising at least one locking element 10 for locking the seal 5 in the feed-through opening 6. The seal 5 further comprises a grommet section 8 configured for feeding through a cable harness 9. The grommet section 8 protrudes from the attachment section 7 in a vehicle outboard direction, which is opposite to the bodywork side surface 3 and the vehicle body 4 but into the base frame 2.

A cable harness 9 is fed from the interior of the vehicle body 4 through the feed-through opening 6 and the grommet section 8 of the seal 5 into the base frame 2 of the rear view assembly 1.

The vehicle body 4 has vehicle internal components 25 arranged on an inside of the vehicle body walls in the vicinity of the feed trough opening 6. Therefore, the cable harness 9 has very limited room on the inside of the vehicle body 4 in order to bend into the feed through opening 6. This is compensated by the grommet section 8 not extending inboard but outboard. In this way, additional room for bending the cable harness 9 is provided in the feed-through opening 3 and the functional sealing of the harness by means of the grommet section 8 is positioned outboard of the vehicle and inside the structure of the base frame 2. Accordingly, a bending radius of the cable harness 9 is large enough to alleviate pressure caused by the sharp turn of the cable harness 9. In this way, the seal 5 and the arrangement thereof in the assembly 1 prevents pressure from the cable harness 9 causing the attachment section 7 of the seal 5 to become dislodged from its seating within the base frame 2.

Figure 2:
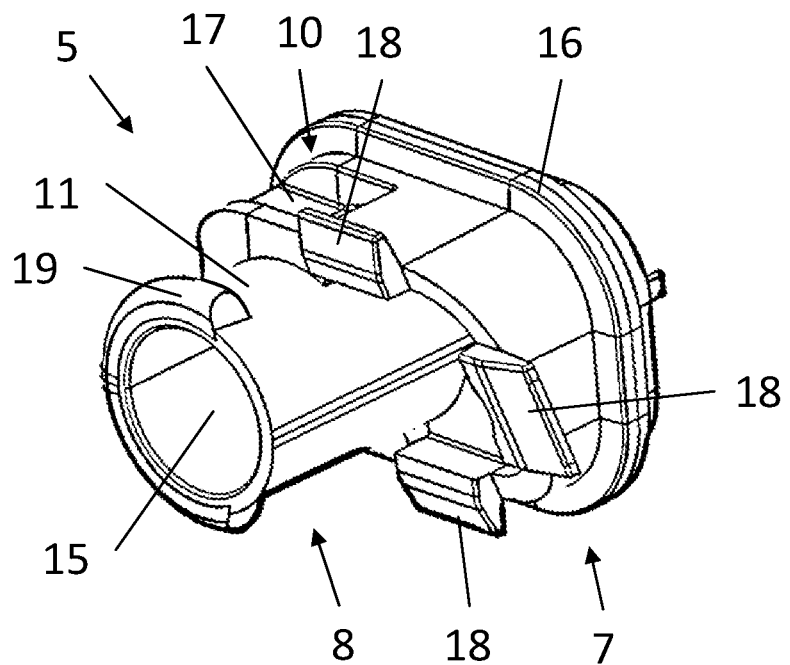
FIG. 2 is a detailed perspective view of a seal when viewed from a grommet section side.

With reference now also to FIG. 2 of the drawings, a detailed perspective view of a seal 5 is shown when viewed from a grommet section side.

The seal 5 is configured for an exterior rear view assembly, for example as shown in FIG. 1. In order to be attached to the bodywork side surface 3 of a mirror base frame 2, the sealing attachment section 7 is formed with a flange 16 configured to fit in the feed-through opening 3 in a sealing manner. Furthermore, the attachment section 7 comprises a locking element 10 in form of a plurality of recesses 17 and noses 18 which are configured to contact the base frame 2 in a form and/or frictional locking manner to secure the seat of the flange in the feed-through opening 3.

For manufacturing, the seal 5 is inserted in the feed-through opening 3 with the grommet section side, the noses 18 are then displaced as the attachment section 7 is inserted. Once the attachment section 7 is completely inserted, the noses 18 spring back to hold the seal 5 in place against the surface of the base frame 2. The structure of the base frame 2 is then securely locked between the flange 16 and the noses 18.

The grommet section 8 protrudes from the attachment section 7 in an outboard direction away from the flange and is formed as a tube with a constant inner diameter in order to feed-through the cable harness 9 in a sealing manner. The grommet section 8 comprises an inner diameter sealing surface 15 configured to seal against the cable harness 9. At its free end, the grommet section 8 comprises an integral diameter extending element 19 formed as a lip.

The attachment section 7 and the grommet section 8 are formed integrally in one part. Therefore, the lip is formed discontinuously around the perimeter and only locally extends an outer diameter of the grommet section 8 in order to ease forming of the seal 5.

Furthermore, the lip is arranged at a distance from the attachment section 7. An intervening segment 11 of the grommet section 8 has a constant outer diameter and is configured to accommodate a cable tie which can be used to fix a cable harness 9 inserted in the seal 5.

Figure 3:
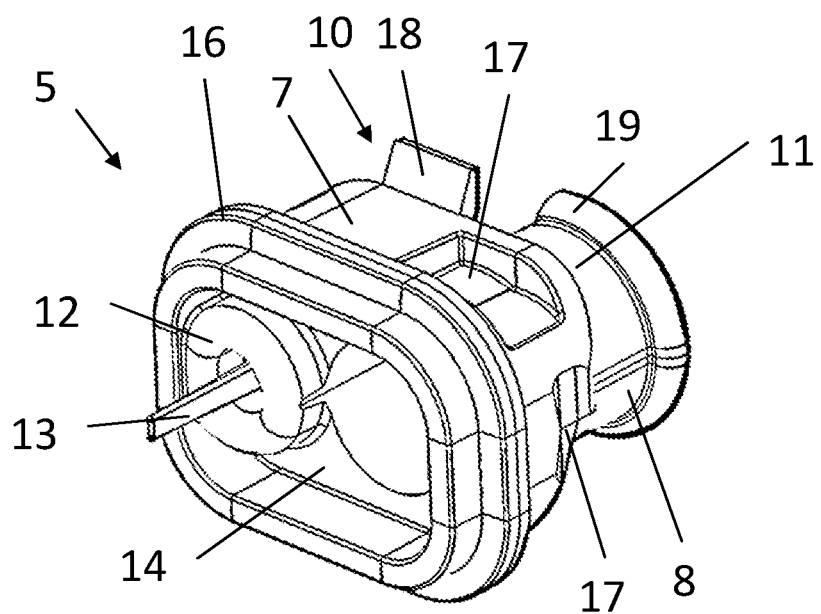
FIG. 3 is a detailed perspective view of the seal of FIG. 2 when viewed from a body surface sealing side.

With reference now also to FIG. 3 of the drawings, a detailed perspective view of the seal 5 of FIG. 2 is shown when viewed from a body surface sealing side.

As can be seen from this perspective, in the present illustrative example, the flange 16 has a rectangular profile with rounded corners. Of course, other profiles such as circular, oval, square, triangular, or the like are possible in further embodiments.

The flange 16 surrounds a bodywork side sealing surface 14. The bodywork side sealing surface 14 is configured for facing towards the bodywork side surface 3 and sealing the feed-through opening 6 by sealed closing the feed-through opening 6 in a mounted state. The attachment section 7 of the seal 5 is configured to be inserted with the flange into the feed-through opening 6, such that the bodywork side seal surface 14 faces towards the bodywork side surface 3 of the base frame 2.

In addition, it can be seen from FIG. 3 that the attachment section 7 comprises a tear-off section 12 having a pull-tab 13 to manually tear it off, such that an additional aperture can be created in the seal 5, if necessary. Of course, such a tear-off section can have various shapes depending on the requirements of the feed through and on the form or number of harnesses to be fed through.

Figure 4:
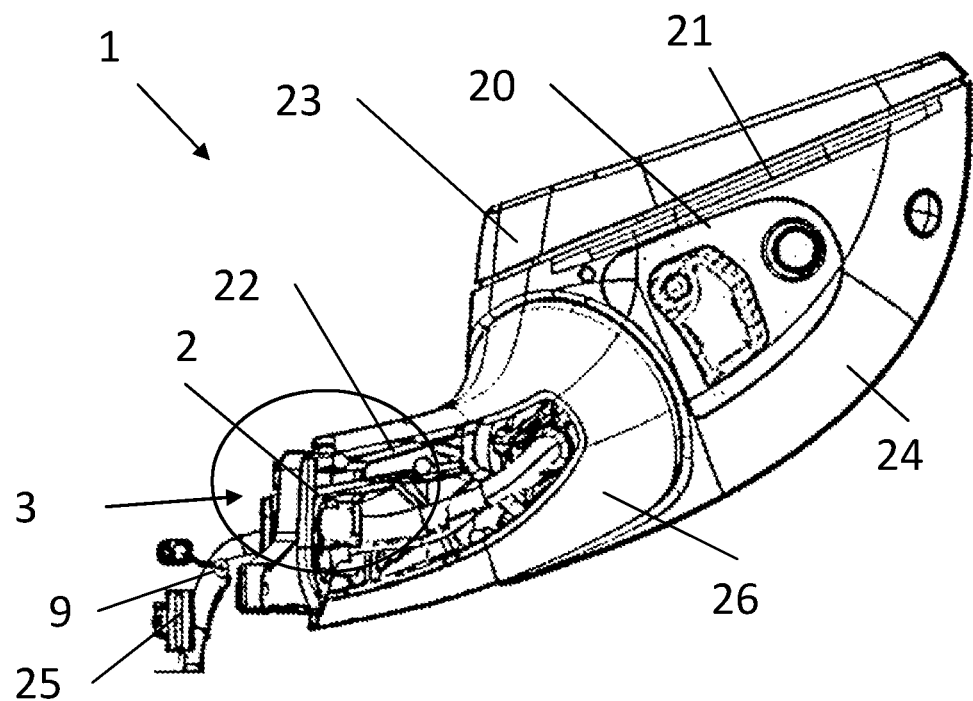
FIG. 4 is a bottom view of a rear view assembly according to an embodiment.

With reference now to FIG. 4, a bottom view of a rear view assembly 1 according to an embodiment is shown with a cable harness 9 fed through.

The exterior rear view assembly 1 of this exemplary embodiment is configured to carry a rear view mirror 20. Accordingly, the base frame 2 is formed as a mirror frame 22. A cover 26 goes over the mirror frame 22 and provides a class A surface The cable harness 9 provides a power supply and control line for functions of the mirror 20 with a mirror reflective element 21, such as for an actuator to adjust the mirror reflective element position, heating of the mirror reflective element, pivoting the mirror, integrated indicator lights and/or the like. The mirror reflective element 21 is cased in a case bezel 23 attached to the base frame 2 and the rest of the base frame 2 is covered by an outer casing 24.

In other embodiments, the exterior rear view assembly 1 can be configured to carry a rear view camera for a digital rear view system and the base frame 2 can be formed as a camera mounting arm. In this case, the cable harness 9 provides a power supply and video signal line for the camera. Of course, additional functions may be integrated, such as e. g. indicator lights and/or the like.

Figure 5:
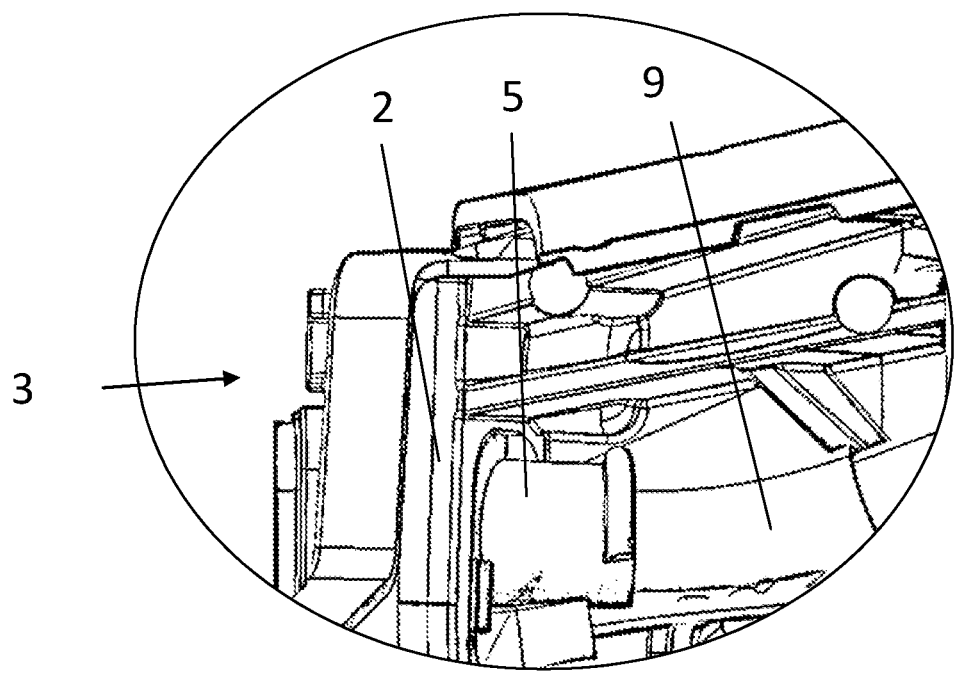
FIG. 5 is a detailed view of the sealing area of the rear view assembly of FIG. 4.

Finally, referring to FIG. 5 of the drawings, a detailed view of the sealing area of the rear view assembly of FIG. 4 is shown.

As already explained with respect to FIGS. 2 and 3, the attachment section is inserted in the feed-through opening 6 of the bodywork side surface 3 and the grommet section extends outboard therefrom and inside the structure of the base frame 2. The cable harness 9 extends through the feed-through opening 6 and is adopted in a sealing manner in the grommet section 8 of the sealing 5.

Although specific embodiments of the invention are illustrated and described herein, it will be appreciated by those of ordinary skill in the art that a variety of alternate and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

LIST OF REFERENCE SIGNS

1 Exterior rear view assembly
2 base frame
3 bodywork side surface
4 vehicle body
5 seal
6 feed-through opening
7 attachment section
8 grommet section
9 cable harness
10 locking element
11 intervening segment
12 tear-off section
13 pull
14 bodywork side sealing surface
15 inner diameter seal surface
16 flange
17 recess
18 nose
19 diameter extending element
20 rear view mirror
21 mirror reflective element
22 mirror frame
23 case bezel
24 case
25 vehicle internal component
26 cover

What we claim is:

1. An exterior rear view assembly, the exterior rear view assembly comprising:
a base frame comprising a bodywork side surface configured to be attached to a vehicle body;
a seal configured to be attached to the base frame for sealing at least one feed-through opening, which is provided on the bodywork side surface,
wherein the seal comprises an attachment section attachable to the bodywork side surface of the base frame and comprising at least one locking element for locking the seal in the feed-through opening,
wherein the seal further comprises a grommet section configured for feed-through of a cable harness and protruding from the attachment section in a vehicle outboard direction,
wherein the grommet section comprises at its free end an integral diameter extending element locally extending an outer diameter of the grommet section,
wherein the diameter extending element is arranged at a distance from the attachment section, wherein an intervening segment of the grommet section has a constant outer diameter and is configured to accommodate a cable tie.

2. The exterior rear view assembly of claim 1, wherein the at least one locking element comprises a plurality of noses which are configured to contact the base frame in a form or in a frictional locking manner.

3. The exterior rear view assembly of claim 1, wherein the at least one locking element comprises a plurality of recesses which are configured to contact the base frame in a form or in a frictional locking manner.

4. The exterior rear view assembly of claim 1, wherein the attachment section is formed with a flange configured to fit in the feed-through opening in a sealing manner, wherein the at least one locking element is configured to secure the seat of the flange in the feed-through opening.

5. The exterior rear view assembly of claim 1, wherein the grommet section is formed as a tube.

6. The exterior rear view assembly of claim 5, wherein the tube of the grommet section has a constant inner diameter.

7. The exterior rear view assembly of claim 1, wherein the integral diameter extending element is a lip or a flange.

8. The exterior rear view assembly of claim 1, wherein the diameter extending element is formed discontinuously around the perimeter of the grommet section.

9. The exterior rear view assembly of claim 1, wherein the attachment section and the grommet section are formed integrally in one part.

10. The exterior rear view assembly of claim 1, wherein the attachment section further comprises a tear-off section configured to be manually torn-off such that an additional aperture is created in the seal.

11. The exterior rear view assembly of claim 10, wherein the attachment section further comprises a tear-off section configured to be manually torn-off with a pull-tab.

12. The exterior rear view assembly of claim 1, wherein the seal is configured to be inserted at least partially in the at least one feed-through opening of the base frame and comprises a bodywork side seal surface facing towards the bodywork side surface.

13. The exterior rear view assembly of claim 12, wherein the seal comprises, in the attachment section, the bodywork side seal surface facing towards the bodywork side surface.

14. The exterior rear view assembly of claim 1, wherein the grommet section comprises an inner diameter seal surface configured to seal against the cable harness.

15. The exterior rear view assembly of claim 1, wherein the exterior rear view assembly is configured to carry a rear view mirror and the base frame is formed as a mirror frame.

16. The exterior rear view assembly of claim 1, wherein the exterior rear view assembly is configured to carry a rear view camera and the base frame is formed as a camera mounting arm.

17. An exterior rear view assembly, the exterior rear view assembly comprising:
   a base frame comprising a bodywork side surface configured to be attached to a vehicle body;
   a seal configured to be attached to the base frame for sealing at least one feed-through opening, which is provided on the bodywork side surface,
   wherein the seal comprises an attachment section attachable to the bodywork side surface of the base frame and comprising at least one locking element for locking the seal in the feed-through opening,
   wherein the seal further comprises a grommet section configured for feed-through of a cable harness and protruding from the attachment section in a vehicle outboard direction,
   wherein the attachment section further comprises a tear-off section configured to be manually torn-off such that an additional aperture is created in the seal.

18. The exterior rear view assembly of claim 17, wherein the attachment section further comprises a tear-off section configured to be manually torn-off with a pull-tab.

\* \* \* \* \*